US005646213A

United States Patent [19]

Guo

[11] Patent Number: 5,646,213

[45] **Date of Patent: *Jul. 8, 1997**

[54] HIGH-SOLIDS AND POWDER COATINGS FROM HYDROXY-FUNCTIONAL ACRYLIC RESINS

[75] Inventor: Shao-Hua Guo, West Goshen, Pa.

[73] Assignee: ARCO Chemical Technology, L.P., Greenville, Del.

[ * ] Notice: The term of this patent shall not extend beyond the expiration date of Pat. No. 5,475,073.

[21] Appl. No.: 673,400

[22] Filed: Jun. 28, 1996

[51] Int. Cl.[6] ........................... C08L 29/06; C08L 33/06; C08L 33/08; C08L 33/10

[52] U.S. Cl. ......................... 524/562; 524/570; 524/577; 524/588; 524/589; 526/333; 526/328.5; 526/329; 526/329.1

[58] Field of Search ................................... 524/562, 588, 524/589; 526/333, 329

[56] References Cited

U.S. PATENT DOCUMENTS

| | | | |
|---|---|---|---|
| 4,518,726 | 5/1985 | Kato et al. | 524/32 |
| 5,244,696 | 9/1993 | Hazan et al. | 427/402 |
| 5,455,297 | 10/1995 | Pedain et al. | 524/591 |
| 5,475,073 | 12/1995 | Guo | 526/333 |
| 5,480,943 | 1/1996 | Guo | 525/330 |
| 5,508,337 | 4/1996 | Wamprecht et al. | 524/507 |
| 5,525,693 | 6/1996 | Duo | 526/329.2 |

*Primary Examiner*—Fred Zitomer

*Attorney, Agent, or Firm*—Jonathan L. Schuchardt

[57] ABSTRACT

High-solids and powder coatings are disclosed. The high-solids coatings comprise an acrylic resin; a melamine, silane, or polyisocyanate crosslinking agent; an organic solvent; and optionally, a pigment and a crosslinking catalyst. The acrylic resin comprises recurring units of an allylic alcohol or propoxylated allylic alcohol, a vinyl aromatic monomer, and one or more acrylate monomers. Powder coatings of the invention comprise an acrylic powder resin having a Tg within the range of about 40° C. to about 80° C. Coatings of the invention are economical and give exterior coatings, especially automotive coatings, with improved weatherability and an excellent balance of physical properties compared with commercial clearcoats.

25 Claims, No Drawings

HIGH-SOLIDS AND POWDER COATINGS FROM HYDROXY-FUNCTIONAL ACRYLIC RESINS

FIELD OF THE INVENTION

The invention relates to interior and exterior coatings. In particular, the invention relates to high-solids and powder coatings made using hydroxy-functional acrylic resins. The coatings are particularly valuable for outdoor finishes, bridge coatings, appliances, aircrafts, coil coatings, wood finishes, metal siding, and automotive primers and topcoats used in the OEM (original equipment manufacture) and refinish markets.

BACKGROUND OF THE INVENTION

Traditionally, most exterior coatings have consisted of a single, pigmented coat. Automotive coatings are just one example. Currently, however, the auto industry uses basecoat/clearcoat technology. First, a relatively thin (0.6–0.8 mil) basecoat that incorporates the pigment or colored material is applied. The basecoat is then sealed by applying a thicker (1.8–2.2 mils) "clearcoat" that contains no pigment. Advantages of the modern approach include higher-solids, lower-VOC coatings; improved appearance; and improved weatherability. Because only a thin basecoat is needed, little pigment is used. The thick clearcoat has a wet, glossy look, and gives a feeling of depth. In addition, it shields the pigment with a thick, UV-resistant barrier. The clearcoat is applied to the basecoat without an intermediate baking step. This "wet-on-wet" method minimizes cost and promotes intercoat adhesion.

Exterior coatings, including automotive clearcoats, are often made by reacting a hydroxy-functional resin with a crosslinker. The resin is usually a hydroxy-functional acrylic resin, which imparts to the coating excellent durability and resistance properties. Melamines, silanes, and polyisocyanates are the most widely used crosslinkers. Acrylic-melamine coatings are used predominantly in automotive OEM applications, while acrylic-urethane coatings are used mostly in refinish ("after-market") applications.

Hydroxy-functional acrylic resins currently used in exterior coatings incorporate recurring units of hydroxyalkyl acrylates, ordinary acrylates, and optionally, other vinyl monomers such as styrene. Hydroxyalkyl acrylate monomers are reaction products of acrylic acid or methacrylic acid and an epoxide (e.g., ethylene oxide or propylene oxide). Unfortunately, hydroxyalkyl acrylates are much more expensive than ordinary acrylate monomers. In addition, a large proportion of hydroxyalkyl acrylate must be used to provide sufficient hydroxyl functionality for favorable resin reactivity with melamine and polyisocyanate crosslinkers. Thus, resins from hydroxyalkyl acrylate monomers are often expensive.

Increasingly stringent EPA air quality regulations limit volatile organic compound (VOC) emissions to the atmosphere. The coatings industry is responding with high-solids formulations. Unfortuately, it is difficult to increase coating solids levels from the current 50 wt. % to the desired level of 60–70 wt. % or more. Low-molecular-weight, low-viscosity resins help to achieve higher-solids formulations, but often at the expense of lost physical properties. Ways to achieve high solids levels without sacrificing coating properties are needed.

Another approach to VOC reduction or elimination is the development of powder coatings. Powder coatings may ultimately dominate the market for exterior coatings, including automotive coatings. Powder coatings typically comprise a blend of a "hard" acrylic polymer (Tg=75°–90° C.) and a "soft" acrylic polymer (Tg=0°–30° C.). The blend, which has a Tg of about 50°–60° C., avoids cold-flow at ambient temperature. Powder coatings cure at 150°–180° C., but are sufficiently stable at lower temperatures (50°–80° C.) to allow thermal processing of the formulations. A solvent is typically not used. Acrylic resins used in powder coatings derive from the expensive hydroxyalkyl acrylate monomers described above. Less expensive powder coating resins are needed.

Recently, we introduced low-molecular-weight, hydroxy-functional acrylic resins that have cost and performance advantages over current resins based on hydroxyalkyl acrylates (see U.S. Pat. Nos. 5,475,073, 5,480,943, and 5,525,693, the teachings of which are incorporated herein by reference). The resins are copolymers derived from an allylic alcohol or propoxylated allylic alcohol, an acrylate or methacrylate monomer, and optionally, one or more additional ethylenic monomers (e.g., styrene). The resins are uniquely prepared without a chain-transfer agent or reaction solvent, and are useful in many thermoset polymer applications, including thermoset polyesters, polyurethanes, crosslinked polymeric resins, melamines, alkyds, uralkyds, and epoxy thermosets. The low viscosity and high hydroxyl functionality of the resins prompted us to investigate their value in exterior coatings, including high-solids and powder coatings.

SUMMARY OF THE INVENTION

The invention is a high-solids or powder coating. High-solids coatings of the invention comprise an acrylic resin, a crosslinking agent, an organic solvent, and optionally, a pigment and a crosslinking catalyst. The acrylic resin comprises recurring units of an allylic alcohol or propoxylated allylic alcohol, a vinyl aromatic monomer, and one or more acrylate monomers. The crosslinking agent is a polyisocyanate, a silane, or a melamine compound.

The invention includes a powder coating and an acrylic resin used to make it. The powder coating comprises the resin, a crosslinking agent, and optionally, a pigment and a crosslinking catalyst. The acrylic powder resin, which comprises high-Tg (70°–90° C.) and low-Tg (0°–20° C.) polymers, has a Tg within the range of about 40° C. to about 80° C.

I surprisingly found that using a hydroxy-functional acrylic resin derived from an allylic alcohol or propoxylated allylic alcohol overcomes many of the problems of using conventional hydroxy-functional acrylic resins (i.e., resins made from hydroxyalkyl acrylates) in exterior coatings such as automotive clearcoats. Formulators of high-solids and powder coatings can incorporate hydroxyl functionality more economically with these resins. In addition, because resin viscosities are so low, higher solids formulations can be made (60 wt. % solids or more). Higher solids content also means that formulators can more easily comply with EPA regulations that control VOC emissions. Compared with commercial coatings, those of the invention offer excellent physical properties, particularly in the area of long-term weathering. Coatings of the invention are particularly valuable in the automotive OEM and refinish markets.

DETAILED DESCRIPTION OF THE INVENTION

High-solids coatings of the invention comprise an acrylic resin, a crosslinking agent, an organic solvent, and optionally a pigment and a crosslinking catalyst. The acrylic resin comprises recurring units of an allylic alcohol or propoxylated allylic alcohol, a vinyl aromatic monomer, and one or more acrylate monomers.

An allylic alcohol or a propoxylated allylic alcohol is a key component of the acrylic resin. Allylic alcohols useful in the invention preferably have the general structure preferably have the general structure $CH_2{=}CR{-}CH_2{-}OH$ in which R is selected from the group consisting of hydrogen and $C_1$–$C_5$ alkyl. Suitable allylic alcohols include, but are not limited to, allyl alcohol, methallyl alcohol, 2-ethyl-2-propen-1-ol, and the like, and mixtures thereof. Allyl alcohol and methallyl alcohol are preferred.

A propoxylated allylic alcohol can be used instead of or in addition to the allylic alcohol. Preferred propoxylated allylic alcohols have the general structure $CH_2{=}CR{-}CH_2{-}(A)_n{-}OH$ in which A is an oxypropylene group, R is selected from the group consisting of hydrogen and $C_1$–$C_5$ alkyl, and n, which is the average number of oxypropylene groups in the propoxylated allylic alcohol, has a value within the range of about 1 to about 2. The oxypropylene groups in the propoxylated allylic alcohols have one or both of the structures $-OCH(CH_3){-}CH_2-$ and $-O{-}CH_2{-}CH(CH_3)-$, which will depend upon the method of synthesis. U.S. Pat. No. 5,475,073, the teachings of which are incorporated herein by reference, describes ways to make suitable propoxylated allylic alcohols.

The proportion of allylic alcohol or propoxylated allylic alcohol present in the acrylic resin depends on many factors, but most important among these is the desired hydroxyl group content of the resin. Generally, it is preferred to incorporate into the resin an amount of allylic alcohol or propoxylated allylic alcohol within the range of about 5 to about 50 wt. %; a more preferred range is from about 10 to about 40 wt. %.

The acrylic resin incorporates recurring units of a vinyl aromatic monomer. Styrene is preferred. The resin preferably contains from about 5 to about 40 wt. % of recurring units derived from the vinyl aromatic monomer; a more preferred range is from about 5 to about 20 wt. %.

The acrylic resin also includes an acrylate or methacrylate monomer. Preferably, the monomer is a $C_1$–$C_{20}$ alkyl or aryl acrylate or methacrylate. Especially preferred are $C_1$–$C_{10}$ alkyl acrylates or methacrylates. Examples include methyl acrylate, methyl methacrylate, ethyl acrylate, butyl acrylate, butyl methacrylate, n-hexyl acrylate, n-hexyl methacrylate, isobornyl acrylate, isobornyl methacrylate, isodecyl acrylate, isodecyl methacrylate, isooctyl acrylate, isooctyl methacrylate, lauryl acrylate, lauryl methacrylate, and the like, and mixtures thereof. Mixtures of various acrylates and methacrylates are advantageously used to control the resin glass-transition temperature.

The acrylate or methacrylate monomer is commonly the major component in the resin. The amount used depends on many factors, particularly the desired end use for the resin. Preferably, the resin will comprise an amount within the range of about 50 to about 90 wt. % of recurring units derived from the acrylate or methacrylate monomer; a more preferred range is from about 60 to about 80 wt. %.

Other ethylenic monomers (from about 0.1 to about 50 wt. %) are optionally included in the acrylate resins to modify or improve end-use properties such as surface gloss, hardness, chemical resistance, and other properties. Preferred ethylenic monomers include unsaturated nitriles, vinyl esters, vinyl ethers, vinyl halides, vinylidene halides, unsaturated anhydrides, unsaturated dicarboxylic acids, acrylic and methacrylic acids, acrylamide and methacrylamide, conjugated dienes, and mixtures thereof. Suitable ethylenic monomers include, for example, acrylonitrile, vinyl acetate, methyl vinyl ether, vinyl chloride, vinylidene chloride, maleic anhydride, maleic acid, fumaric acid, and the like.

The acrylic resin usually has a number average molecular weight within the range of about 500 to about 10,000. A more preferred range is from about 1000 to about 5000. In addition, the acrylic resin typically has a hydroxyl number within the range of about 20 to about 500 mg KOH/g. A more preferred range is from about 60 to about 160 mg KOH/g; most preferred is the range from about 100 to about 140 mg KOH/g. The average hydroxyl functionality of the acrylic resin is generally from about 1 to about 10. A preferred range is from about 2 to about 5.

The glass-transition temperature (Tg) of the resin is the temperature at which the amorphous polymer resin changes from a glassy state to a rubbery state. It is an important value for coating resins because it helps one to predict coating properties such as hardness, gloss, and impact resistance. The acrylic resins used in the high-solids clearcoats of the invention preferably have glass-transition temperatures within the range of about −30° C. to about 50° C. A more preferred range is from about −20° C. to about 50° C.

The acrylic resin is prepared by any suitable free-radical polymerization process. U.S. Pat. No. 5,475,073, which is incorporated herein by reference, describes a preferred process for making the resin. Generally, it is preferred to add at least about 50 wt. %, preferably at least about 70 wt. %, of the acrylate or methacrylate monomer to the reaction mixture gradually during the course of the polymerization. Preferably, the acrylate or methacrylate monomer is added at such a rate as to maintain a steady, low concentration of the acrylate monomer in the reaction mixture. Preferably, the ratio of allylic to acrylate monomers is kept essentially constant; this helps to produce a resin having a relatively uniform composition. Gradual addition of the acrylate monomer enables the preparation of acrylate resins having sufficiently low molecular weight and sufficiently high allylic alcohol or propoxylated allylic alcohol content. Generally, it is preferred to add the free-radical initiator to the reactor gradually during the course of the polymerization; it is also desirable to match the addition rate of the free-radical initiator to the addition rate of the acrylate or methacrylate monomer.

In addition to the acrylic resin, the high-solids coatings of the invention include a crosslinking agent. The crosslinking agent is a polyisocyanate, a silane, or a melamine compound. When a polyisocyanate crosslinker is used, the product is an acrylic-urethane coating; when a melamine crosslinker is used, the product is an acrylic-melamine coating.

Polyisocyanate crosslinking agents useful for making acrylic-urethane coatings of the invention include diisocyanates, polyisocyanates, and isocyanate-terminated prepolymers that are well known in the polyurethane industry. Isocyanate-terminated prepolymers are made in the usual way from a polyisocyanate and a polyether polyol, polyester polyol, or the like. Suitable polyisocyanates for use include those commonly used in the polyurethane industry. Aliphatic polyisocyanates are preferred. Preferred polyisocyanates include, for example, 1,6-hexamethylene diisocyanate (HDI), polymeric HDIs, isophorone diisocyanate (IPDI), polymeric IPDIs, and IPDI- or HDI-based isocyanate-terminated prepolymers such as, for example, AIRTHANE ASN-540M prepolymer (product of Air Products). Optionally, a low molecular weight chain extender (diol, diamine, or the like) is included in making the high-solids coating.

The urethane-acrylic coating is formulated at any desired NCO index, but it is preferred to use an NCO index close to 1. If desired, all of the available NCO groups are reacted with hydroxy groups from the acrylic resins and any chain extenders. Alternatively, an excess of NCO groups remain in the product, as in a moisture-cured polyurethane. Example 2 below illustrates how to make a urethane-acrylic clearcoat of the invention.

Melamine-acrylic coatings of the invention are made by reacting the acrylic resin with a melamine compound. Suitable melamine compounds for use in making high-solids coatings of the invention include commercial grade hexamethoxymethylmelamines, such as, for example, CYMEL 370 and CYMEL 325 crosslinking agents (products of Cytec).

A silane crosslinker can also be used to make a coating of the invention. Suitable silane crosslinkers are known in the art, and are taught, for example, in U.S. Pat. Nos. 4,368,297, 4,518,726, and 5,244,696, the teachings of which are incorporated herein by reference. Suitable silane crosslinkers include, for example, copolymers of unsaturated monomers (e.g., acrylates) and alkoxysilanes having olefin or acrylate functionality (e.g., vinylalkoxysilanes or acrylatoalkoxysilanes).

High-solids coatings of the invention include from about 20 to about 50 wt. %, more preferably from about 20 to about 35 wt. %, of an organic solvent. Thus, the solids content of the coating formulations is from about 50 to about 80 wt. %, preferably from about 65 to about 80 wt. %. Suitable solvents include, for example, ethers, esters, ketones, aromatic and aliphatic hydrocarbons, alcohols, glycol ethers, glycol ether esters, and the like, and mixtures thereof. Ketones, ethers, esters, aromatic hydrocarbons, and mixtures thereof, are preferred.

The high-solids coatings optionally include a crosslinking catalyst, which allows curing to occur at relatively low temperatures. The catalyst is used in an amount effective to produce a cured coating under the conditions used to apply and cure the coating. The type of crosslinking catalyst used depends on the type of coating made. Acrylic-urethane coatings use catalysts commonly known in the polyurethane art for reacting polyol hydroxyl groups and isocyanate groups. Preferred catalysts are organotin compounds such as, for example, stannous octoate, dibutyltin dilaurate, and the like. For acrylic-melamine coatings, an organic sulfonic acid such as p-toluenesulfonic acid is the preferred crosslinking catalyst, although other acidic compounds such as sulfuric acid may be used. Organotin compounds are commonly used with silane crosslinking agents. The amount of catalyst used in the coating depends on many factors, but is typically present in an amount within the range of about 0.0001 to about 5 wt. %.

I surprisingly found that using a hydroxy-functional acrylic resin derived from an allylic alcohol or propoxylated allylic alcohol overcomes many of the problems of using conventional hydroxy-functional acrylic resins (i.e., resins made from hydroxyalkyl acrylates) in typical high-solids coatings. Formulators of acrylic-melamine and acrylic-urethane coatings can incorporate hydroxyl functionality more economically with these resins (especially when allyl alcohol is used) because the more-expensive hydroxyalkyl acrylates can be replaced. In addition, because resin viscosities are so low, higher solids formulations can be made. Higher solids content also means that formulators can more easily comply with EPA regulations that control VOC emissions.

The invention includes a powder coating and an acrylic resin used to make it. The powder coating comprises the resin, a crosslinking agent, and optionally, a pigment and a crosslinking catalyst.

The acrylic powder resin comprises high-Tg and low-Tg polymers, and has an overall Tg within the range of about 40° C. to about 80° C., preferably within the range of about 50° C. to about 70° C.

The high-Tg polymer comprises recurring units of an allylic alcohol or a propoxylated allylic alcohol and one or more acrylate monomers as described above, and has a Tg within the range of about 70° C. to about 90° C. Preferably, the high-Tg polymer contains from about 5 to about 30 wt. % of recurring units derived from the allylic alcohol or propoxylated allylic alcohol, and from about 70 to about 95 wt. % of recurring units derived from the acrylate monomer(s). Optionally, the high-Tg polymer also incorporates recurring units of a vinyl aromatic monomer. This polymer enables preparation of a coating that avoids cold-flow at ambient temperatures. Acrylate monomers that produce high-Tg polymers, for example methyl methacrylate, isobornyl methacrylate, and the like, are predominantly used for making the high-Tg polymer of the acrylic powder resin.

The low-Tg polymer also comprises recurring units of an allylic alcohol or a propoxylated allylic alcohol and one or more acrylate monomers. However, this polymer has a Tg within the range of about 0° C. to about 20° C. Preferably, the low-Tg polymer contains from about 5 to about 30 wt. % of recurring units derived from the allylic alcohol or propoxylated allylic alcohol, and from about 70 to about 95 wt. % of recurring units derived from the acrylate monomer(s). Optionally, the low-Tg polymer also incorporates recurring units of a vinyl aromatic monomer. This polymer allows for high powder flow, and good smoothness and gloss in the coating. Acrylate monomers that produce low-Tg polymers, for example, butyl acrylate or long-chain acrylates (lauryl acrylate, isodecyl methacrylate, isooctyl acrylate) are predominantly used for making the low-Tg polymer of the acrylic powder resin.

The powder acrylic resin is prepared by any suitable method. If desired, one can prepare the high-Tg and low-Tg polymers individually in separate reactors, and then later blend them to produce a resin that has the desired Tg. It is usually more convenient, and therefore preferred, to make the resin in a single pot. Either of the two polymers can be prepared first. For example, one can first make a high-Tg polymer by copolymerizing the allylic alcohol or propoxylated allylic alcohol with acrylate monomer(s) that give a high-Tg polymer (e.g., methyl methacrylate), and subsequently introduce into the same vessel other acrylate monomer(s) (e.g., butyl acrylate or long-chain acrylates). These later-added acrylates will copolymerize with the remaining unreacted allylic alcohol or propoxylated allylic alcohol to produce the low-Tg polymer. It is also possible to reverse the order and make the low-Tg polymer first. In any event, the acrylic powder resin contains a high-Tg polymer and a low-Tg polymer, each of which incorporates hydroxyl functionality from the allylic alcohol or propoxylated allylic alcohol.

In addition to the resin, powder coatings of the invention include a crosslinking agent and, optionally, a pigment and a crosslinking catalyst. Melamine compounds, silanes, and blocked polyisocyanates are suitable crosslinking agents. Suitable melamine compounds preferably have a melting point above room temperature. Preferred melamine compounds include the glycoluri family of aminoplast crosslinking agents, such as tetramethoxymethyl glycoluri, which is available from Cytec as POWDERLINK 1174 crosslinking agent. Blocked polyisocyanates have protected —NCO groups. When the coating is applied and cured, typically at elevated temperature, the protecting groups are liberated, and the free —NCO groups react with the hydroxyl groups of the acrylic resin. Suitable blocked polyisocyanates, which are well known in the art, are described, for example, in U.S. Pat. No. 5,508,337, the teachings of which are incorporated herein by reference. Suitable crosslinking catalysts include those described above for use in making high-solids coatings. Preferred crosslinking catalysts, however, have a melting point above room temperature. Particularly preferred are compounds from the sulfonimide family of nitrogen acids, such as N-methanesulfonyl-p-toluenesulfonamide.

The high-solids and powder coatings of the invention are well-suited for use as clearcoats, including automotive topcoats. However, the coatings can include, if desired, pigments (e.g., titanium dioxide), colored materials such as dyes, flow-control agents, low-profile additives, UV stabilizers, plasticizers, fillers, or other components.

The coatings are generally cured at a temperature within the range of about room temperature to about 250° C. The curing temperture needed depends on many factors, including the type of crosslinking agent, whether or not a crosslinking catalyst is used, the type of catalyst, the amount of catalyst used, and other factors known to those skilled in the art.

High-solids and powder coatings of the invention incorporate hydroxyl functionality economically compared with conventional acrylic resins based on hydroxyalkyl acrylates. Compared with commercial coatings, those of the invention offer excellent physical properties. As shown in the examples below, clearcoats of the invention can be used at significantly higher solids levels, and give good physical properties overall, and better weathering properties than a comparable commercial clearcoat.

The following examples merely illustrate the invention. Those skilled in the art will recognize many variations that are within the spirit of the invention and scope of the claims.

EXAMPLE 1

Preparation of a Hydroxy-Functional Acrylic Resin

A five-liter stainless-steel reactor equipped with agitator, oil heating jacket, temperature controller, nitrogen purge device, vacuum distillation device, and pumps for monomers or initiator, is charged with allyl alcohol (655 g). Styrene (143 g), methyl methacrylate (143 g), n-butyl acrylate (204 g) , and n-butyl methacrylate (1064 g) are mixed and then charged to the monomer addition pump. Di-tert-butylperoxide (83 g) is charged to the initiator addition pump. Monomer mixture (378 g) and di-tert-butylperoxide (26 g) are pumped into the reactor. The reactor is purged three times with nitrogen, sealed, and the contents are heated to 135° C.

The remaining monomer mixture and initiator are added to the reactor gradually at a decreasing rate over 5 h while maintaining the reaction temperature at 135° C. The addition rates are as follows: Monomer mixture: hour 1: 380 g; hour 2: 297 g; hour 3: 214 g; hour 4: 160 g; hour 5: 126 g. Initiator: hour 1: 18.5 g; hour 2: 14.3 g; hour 3: 10.3 g; hour 4: 7.8 g; hour 5: 6.1 g. The reaction mixture is kept at 135° C. for another 0.5 h following monomer and initiator addition. Unreacted monomers are removed by vacuum distillation (maximum temperature, 150° C.). After removing a sample for analysis, the mixture is cooled, and propylene glycol methyl ether acetate (648 g) is added. The resin solution is discharged from the reactor at 50° C. The resin solution (2158 g) has a solids content of 70 wt. %. Analysis by gel permeation chromatography (GPC) reveals: Mw=6340; Mn=2210. Hydroxyl number (of the solid resin) =125 mg KOH/g.

EXAMPLE 2

Preparation and Evaluation of a Two-Component Polyurethane Clearcoat Formulation

Clearcoat Preparation

Component A (the hydroxyl component) of the clearcoat is prepared by mixing the resin solution of Example 1 (1312 g) with xylene (125 g), methyl ethyl ketone (MEK, 62.5 g), and di-butyltin dilaurate solution (2% in MEK, 3.38 g). Component B (the isocyanate component) is a polymeric HDI (DESMODUR N3300 isocyanate (product of Bayer), 90% solids in a mixture of n-butyl acetate and AROMATIC 100 solvent (product of Exxon Chemical) (1:1 ratio)). A clearcoat is prepared by mixing Components A and B and diluting to a spray viscosity of about 40 sec. (Fisher Cup #2) prior to application.

Coating Application and Curing

Metal panels (4"×12") are precoated with an E-coat and a primer. A commercial water-borne acrylic blue-pigmented basecoat is then sprayed onto the panels in two passes with a 60-sec. flash-off between passes. The panels are air flashed for 5 min., and then flashed in an oven for 5 min. at 180° F. to remove water from the basecoat. The clearcoat is then applied using a standard "wet-on-wet" process by spraying it over the basecoat in two passes, with a 60-sec. flash-off between passes, followed by a 20-min. flash-off before baking. The panels are baked to cure in an oven at 265° F. for 30 min. The dry-film thicknesses of the basecoat and the clearcoat are 0.6 and 2.0 mils, respectively.

Coating Physical Property Evaluation

Degree of cure is determined by the "Solvent Rub Test" (GM Method 9509 06/89) using xylene as the solvent. The clearcoat has a cure rating of 0 (completely cured).

Chip resistance is evaluated using GM Method 9508P 07/91, Method A. The panel tested is rated at 7. No failure between the basecoat and topcoat layers occurs.

GM Method 9500P 11/88 (the "Gasoline Puddle Test") is used to evaluate fuel resistance of the coating. A synthetic gas mixture (45% toluene and 55% VM&P Naptha) is used. The panel is saturated for 5 min. in the gas, and is then inspected. The process is repeated twice. The coating passes the test.

The "Gasoline Dip Test" (GM Method 9501P 09/88 and GM Method 9507P 09/88) is also used. The panels are immersed for 10 sec., then dried off for 20 sec., then re-immersed in the fuel. This process is repeated for 20 cycles. The panel is tested for Thumbnail Hardness (GM Method 9507P 09/88) after every fifth cycle. The coating passes the test with no visible change (i.e., there is no visible crinkling, lifting, rosebudding, or blistering).

Humidity testing is conducted using GM Method 4465P 07/88. The coating passes the test without blistering or any change in appearance.

GM Method 9071P 08/89, Method A is used to test adhesion. The test is conducted both before and after the humidity testing. The coating passes with the best rating (0) both before and after the humidity test.

An accelerated weathering test is conducted according to SAE Method J1960 using a controlled-irradiance water-cooled xenon arc apparatus. The gloss retentions at 20° after 500, 1000, 1500, 2000, 2500, 3000, and 3500 hours are 97, 95, 80, 80, 78, 74, and 66%, respectively.

Resistance to environmental acid and alkali are tested according to GM Method 9533P 01/92, Method 2. The tested solutions include acid rain of pH 3, acid rain of pH 4, 10 wt. % sulfuric acid solutions of pH 2.0, 3.0, and 4.0, calcium sulfate solution (0.75 wt. %) of pH 4.0, deionized water, tap water, and egg albumin (2 wt. % in deionized water). The coating passes the test with no visible changes.

COMPARATIVE EXAMPLE 3

Polyurethane Clearcoat from a Commercial High-Solids Hydroxy-Functional Acrylic Resin A commercial high-solids hydroxy-functional acrylic resin is used to formulate an automotive clearcoat similar to that of Example 2. This commercial resin has a hydroxyl number of 115 mg KOH/g. The solution viscosity of the commercial resin at 70 wt. % solids in propylene glycol methyl ether acetate (Brookfield @25° C.: 10,000–14,000 cps), however, is significantly higher than that of the resin of Example 2 (Brookfield @25° C.: 3800 cps). Therefore, the automotive clearcoat formulated from the commercial resin has a considerably lower wt. % solids (49 wt. %) compared with that of Example 2 (59 wt. %) when both clearcoats are compared at the same spray viscosity.

The automotive clearcoat formulated from the commercial resin shows similar physical properties to that of Example 2, but it has lower weathering stability. The 20° gloss retention (3500 hours, xenon arc) is 55%, compared with 67% for the clearcoat of Example 2. DOI retention after 6 months of Florida exposure is 55%, compared with 92% for the clearcoat of Example 2.

EXAMPLE 4

Preparation of a Two-Component Polyurethane Clearcoat Formulation

A hydroxy-functional acrylic resin (hydroxyl number=90 mg KOH/g) is made generally by the process of Example 1, but with less allyl alcohol. The automotive clearcoat is formulated and evaluated as in Example 2. The clearcoat passes all of the tests described in Example 2, but fails the gasoline dip test after 15 cycles. This indicates that a resin of sufficiently high hydroxyl number should be used to make the clearcoats when chemical or gasoline resistance is important.

EXAMPLE 5

Preparation of a Hydroxy-Functional Acrylic Resin from Allyl Alcohol Monopropoxylate and a Polyurethane Clearcoat from the Resin Example 1 is repeated, except that allyl alcohol monopropoxylate (755 g) is used instead of allyl alcohol. The resin solution (2908 g) is 70 wt. % solids. The resin has Mw=10770, Mn=3310, and hydroxyl number=131 mg KOH/g.

An automotive clearcoat is formulated and evaluated as described in Example 2, and its physical properties are similar to those of the clearcoat of Example 2.

EXAMPLE 6

Preparation of a Hydroxy-Functional Acrylic Resin from a Propoxylated Allyl Alcohol and a Polyurethane Clearcoat from the Resin Example 1 is repeated, except that propoxylated allyl alcohol (average of 1.6 oxypropylene units per molecule, 970 g) is used instead of allyl alcohol. The resin solution (3106 g) is 70 wt. % solids. The resin has Mw=10660, Mn=3120, and hydroxyl number=128 mg KOH/g. An automotive clearcoat is formulated and evaluated as described in Example 2, and its physical properties are similar to those of the clearcoat of Example 2.

EXAMPLE 7

Preparation of a Powder Coating Resin using Allyl Alcohol Monopropoxylate

In stage one of the preparation, a polymer of high Tg is prepared as follows. Allyl alcohol monopropoxylate (138 g) is charged to a one-liter stainless-steel reactor equipped with agitator, steam heating jacket, temperature controller, nitrogen inlet, vacuum distillation device, and addition pump. Methyl methacrylate (400 g), n-butyl acrylate (40 g), and di-tert-butylperoxide (25 g) are mixed, cooled to 5° C., and charged to the addition pump. Part of this mixture (100 g) is pumped into the reactor. After purging three times with nitrogen, the reactor is sealed, and the contents are heated to 145° C. The rest of the mixture is added over the next three hours at a decreasing rate of addition as follows: first hour: 150 g; second hour: 125 g; third hour: 100 g. The resulting product is a high-Tg polymer that contains hydroxyl functional groups derived from the allyl alcohol monopropoxylate.

In stage two, a polymer of low Tg is prepared as follows. Unreacted allyl alcohol monopropoxylate from stage one remains in the reaction mixture with the high-Tg polymer. The addition pump is recharged with a chilled mixture of methyl methacrylate (15 g), butyl methacrylate (100 g), n-butyl acrylate (20 g), styrene (15 g), and di-tert-butylperoxide (8.0 g). This mixture is added to the reaction mixture (prepared in stage one) at 145° C. at a decreasing rate over 3 h as follows: first hour: 75 g; second hour: 50 g; third hour: 33 g. After the second-stage addition is complete, the mixture is heated at 145° C. for another 0.5 h. Unreacted monomer is now removed by stripping under vacuum and stripping with the aid of xylenes at 165° C. Yield: 650 g of solid resin (Tg=45° C.).

EXAMPLE 8

Acrylic-Melamine Clear Powder Coating

The acrylic resin of Example 7 (85 parts) is mixed with POWDERLINK 1174 melamine crosslinker (15 parts, product of Cytec Industries, Inc.), benzoin tosylate (blocked catalyst) (2.5 parts, product of Ciba-Geigy Corp.), RESIN-FLOW P76 flow control agent (1.25 parts, product of Estron Corp.), and benzoin (1.4 parts). This formulation is mixed and sprayed by a standard powder coating process. The coated panel is baked at 175° C. for 30 min. to cure. The cured film is expected to be hard, glossy, and nice in appearance.

The preceding examples are meant only as illustrations; the following claims define the scope of the invention.

I claim:

1. A high-solids coating which comprises:

(a) an acrylic resin which comprises recurring units of:
  (1) an allylic alcohol or a propoxylated allylic alcohol;
  (2) a vinyl aromatic monomer; and
  (3) one or more acrylate monomers;

(b) a crosslinking agent selected from the group consisting of polyisocyanates, silanes, and melamine compounds;

(c) from about 20 to about 50 wt. % of an organic solvent; and (d) optionally, a pigment and a crosslinking catalyst.

2. The coating of claim 1 wherein the resin has a glass-transition temperature within the range of about −20° C. to about 50° C.

3. The coating of claim 1 wherein the resin has a hydroxyl number within the range of about 60 to about 160 mg KOH/g.

4. The coating of claim 1 wherein the resin has a number average molecular weight within the range of about 1000 to about 5000.

5. The coating of claim 1 wherein the acrylic resin comprises from about 5 to about 50 wt. % of the allylic alcohol or propoxylated allylic alcohol, from about 5 to about 40 wt. % of the vinyl aromatic monomer, and from about 50 to about 90 wt. % of the acrylate monomer.

6. The coating of claim 1 wherein the allylic alcohol is selected from the group consisting of allyl alcohol and methallyl alcohol.

7. The coating of claim 1 wherein the propoxylated allylic alcohol has the formula $CH_2{=}CR{-}CH_2{-}(A)_n{-}OH$ in which A is an oxypropylene group, R is selected from the group consisting of hydrogen and $C_1$–$C_5$ alkyl, and n, which is the average number of oxypropylene groups in the propoxylated allylic alcohol has a value within the range of about 1 to about 2.

8. The coating of claim 1 wherein the vinyl aromatic monomer is styrene.

9. The coating of claim 1 wherein the acrylate monomer is a $C_1$–$C_{20}$ alkyl or aryl acrylate or methacrylate monomer.

10. The coating of claim 1 wherein the polyisocyanate is selected from the group consisting of 1,6-hexamethylene diisocyanate (HDI), polymeric HDIs, isophorone diisocyanate (IPDI), polymeric IPDIs, and IPDI- or HDI-based isocyanate-terminated prepolymers.

11. The coating of claim 1 wherein the organic solvent is selected from the group consisting of ethers, esters, ketones, aromatic and aliphatic hydrocarbons, alcohols, glycol ethers, glycol ether esters, and mixtures thereof.

12. The coating of claim 1 wherein the crosslinking catalyst is selected from the group consisting of organotin compounds and organic sulfonic acids.

13. A high-solids, acrylic-urethane automotive clearcoat which comprises:

(a) an acrylic resin which comprises recurring units of:
  (1) an allylic alcohol or a propoxylated allyl alcohol of the formula $CH_2{=}CR{-}CH_2{-}(A)_n{-}OH$ in which A is an oxypropylene group, R is selected from the group consisting of hydrogen and $C_1$–$C_5$ alkyl, and n, which is the average number of oxypropylene groups in the propoxylated allylic alcohol has a value within the range of about 1 to about 2;
  (2) a vinyl aromatic monomer; and
  (3) one or more $C_1$–$C_{20}$ alkyl or aryl acrylate or methacrylate monomers;

wherein the resin has a glass-transition temperature within the range of about −20° C. to about 50° C., a hydroxyl number within the range of about 60 to about 160 mg KOH/g, and a number average molecular weight within the range of about 1000 to about 5000;

(b) one or more polyisocyanates;

(c) from about 20 to about 50 wt. % of an organic solvent; and (d) optionally, a crosslinking catalyst.

14. The clearcoat of claim 13 wherein the polyisocyanate is selected from the group consisting of 1,6-hexamethylene diisocyanate (HDI), polymeric HDIs, isophorone diisocyanate (IPDI), polymeric IPDIs, and IPDI- or HDI-based isocyanate-terminated prepolymers.

15. The clearcoat of claim 13 wherein the allylic alcohol is allyl alcohol and the vinyl aromatic monomer is styrene.

16. A high-solids, acrylic-melamine automotive clearcoat which comprises:

(a) an acrylic resin which comprises recurring units of:
  (1) an allylic alcohol or a propoxylated allyl alcohol of the formula $CH_2{=}CR{-}CH_2{-}(A)_n{-}OH$ in which A is an oxypropylene group, R is selected from the group consisting of hydrogen and $C_1$–$C_5$ alkyl, and n, which is the average number of oxypropylene groups in the propoxylated allylic alcohol has a value within the range of about 1 to about 2;
  (2) a vinyl aromatic monomer; and
  (3) one or more $C_1$–$C_{20}$ alkyl or aryl acrylate or methacrylate monomers;

wherein the resin has a glass-transition temperature within the range of about −20° C. to about 50° C., a hydroxyl number within the range of about 60 to about 160 mg KOH/g, and a number average molecular weight within the range of about 1000 to about 5000;

(b) a melamine compound;

(c) from about 20 to about 50 wt. % of an organic solvent; and (d) optionally, a crosslinking catalyst.

17. The clearcoat of claim 16 wherein the melamine compound is a hexamethoxymethylmelamine.

18. The clearcoat of claim 16 wherein the allylic alcohol is allyl alcohol and the vinyl aromatic monomer is styrene.

19. A powder coating which comprises:

(a) an acrylic powder resin which comprises:
  (1) a high-Tg polymer comprising recurring units of an allylic alcohol or a propoxylated allylic alcohol and one or more acrylate monomers, said high-Tg polymer having a Tg within the range of about 70° C. to about 90° C.; and
  (2) a low-Tg polymer comprising recurring units of an allylic alcohol or a propoxylated allylic alcohol and one or more acrylate monomers, said low-Tg polymer having a Tg within the range of about 0° C. to about 20° C.;

wherein the acrylic powder resin has a Tg within the range of about 40° C. to about 80° C.;

(b) a crosslinking agent selected from the group consisting of blocked polyisocyanates, silanes, and melamine compounds; and (c) optionally, a pigment, a flow-control agent, and a crosslinking catalyst.

20. The powder coating of claim 19 wherein the propoxylated allylic alcohol has the formula $CH_2{=}CR{-}CH_2{-}(A)_n{-}OH$ in which A is an oxypropylene group, R is selected from the group consisting of hydrogen and $C_1$–$C_5$ alkyl, and n, which is the average number of oxypropylene groups in the propoxylated allylic alcohol has a value within the range of about 1 to about 2.

21. An acrylic powder resin which comprises:

(a) a high-Tg polymer comprising recurring units of an allylic alcohol or a propoxylated allylic alcohol and one or more acrylate monomers, said high-Tg polymer having a Tg within the range of about 70° C. to about 90° C.; and (b) a low-Tg polymer comprising recurring units of an allylic alcohol or a propoxylated allylic alcohol and one or more acrylate monomers, said low-Tg polymer having a Tg within the range of about 0° C. to about 20° C.;

wherein the acrylic powder resin has a Tg within the range of about 40° C. to about 80° C.

22. A substrate coated with the coating of claim 1.

23. A substrate coated with the clearcoat of claim 13.

24. A substrate coated with the clearcoat of claim 16.

25. A substrate coated with the coating of claim 19.

* * * * *